INVENTORS
THOMAS C. MERIGAN, JR.
FRITZ ECKSTEIN
ERIC D. A. DE CLERCQ
By Gregg & Hendricson
ATTORNEYS

United States Patent Office 3,687,808
Patented Aug. 29, 1972

3,687,808
SYNTHETIC POLYNUCLEOTIDES
Thomas C. Merigan, Jr., Menlo Park, Calif., Fritz Eckstein, Gottingen, Germany, and Eric Desire Alice de Clercq, Hamme, Belgium, assignors to The Board of Trustees of the Leland Stanford Junior University, Stanford, Calif.
Continuation-in-part of application Ser. No. 833,314, June 14, 1969. This application Aug. 14, 1969, Ser. No. 850,154
Int. Cl. C07c 51/52, 51/54
U.S. Cl. 195—28 N    26 Claims

ABSTRACT OF THE DISCLOSURE

Polynucleotides having sulfur replacing one or more of the oxygen atoms bonded to phosphorus are prepared by polymerizing a mononucleotide in which the phosphorus is present in the form of a phosphorothioate having one or more sulfur atoms bonded to the phosphorus. A suitable biocatalyst is used to effect polymerization and where necessary a biotemplate is also used. The resulting polynucleotide thio-analogues have enhanced interferon inducing properties.

---

The invention described herein was made in the course of work under a grant or award from the Department of Health, Education, and Welfare.

This application is a continuation-in-part of our copending application Ser. No. 833,314 filed June 14, 1969 and now abandoned.

This invention relates to synthetic polynucleotides in which one or more oxygen atoms bonded to the phosphorus atoms of the polynucleotide are substituted by sulfur. The invention also relates to intermediates used in the synthesis of these polynucleotides, to processes of synthesizing the intermediates and synthesizing the polynucleotides, and to processes of using the polynucleotides.

It is known that certain polymers, among them certain synthetic non-nucleotide polymers [Merigan and Finkelstein Virology, 35, 363 (1968)] and certain polynucleotides [Lampson, Hilleman and others, Proceedings National Academy of Sciences, 58, 782, 1004, 1719, 2102 (1967) and 61, 340 (1968)] have the effect of stimulating cells to produce interferon. However, such effectiveness of such polynucleotides has been deficient, e.g., it has been effective only for short periods of time. Synthetic nonnucleotides, for example, pyran (which is a copolymer of maleic acid and divinyl ether) have been shown to have long term effects but they have not been subject to sufficiently rapid biodegration.

It is an object of the present invention to provide improvements in the field of agents effective to induce the production of interferon.

It is a further object of the invention to provide certain synthetic polynucleotide analogues having greater and more effective capacity to induce the production of interferon than those heretofore available.

The foregoing and other objects of the invention will be apparent from the ensuing description and the appended claims.

GENERAL DESCRIPTION

The following will serve as a general description of the invention and will also establish certain nomenclature and define certain symbols used hereinafter.

In general, polynucleotides other than those of the present invention have a general formula which can be represented as follows:

I wherein $n$ is an integer, X is hydroxyl (i.e., the sugar entity is ribose) or hydrogen (i.e., the sugar entity is deoxyribose) and B represents the base entity. Typically $n$ has a large value, e.g., about 50 or more. B may be any of the purine or pyrimidine bases, such as adenine, cytosine, quanine, uracil, thymine, hypoxanthine, etc. The polymer may be a homopolymer with respect to the base, i.e., all of the bases B are identical or it may be hetero with respect to the base by having two or more different bases attached to the backbone of the polymer. An example of a homopolymer is the following:

II wherein A represents the base adenine. This polymer can be represented also by a simplified formula as follows:

III wherein r represents the ribose entity, A represents the adenine entity and p represents the phosphate entity. This formula may be further shortened to the following:

poly rA

IV wherein A and r have the same significance and the prefix "poly" indicates that the rA unit is repeated. It is understood that the phosphate entity is also present. A heteropolymer wherein, for example, the basis adenine and uracil are attached to the polymer backbone, may be represented as follows:

V wherein A and U signify the adenine and uracil entities respectively. This polymer may also be represented by the formulas:

in Formulae I to VIB the pentose unit may be deoxyribose (d) instead of ribose and the polymer backbone may be heterogeneous with respect to the pentose units, e.g., both ribose (r) and deoxyribose (d) units may be present. Also other monosaccharide units may replace ribose and deoxyribose, e.g., xylose and arabinose.

Quite commonly such polynucleotides are associated as multiple strand helices by base pairing (e.g., hydrogen bonding) of two or more strands of polymer. Thus poly rAU will normally occur as two strands in the form of a helix with the A units of one strand paired with the U units of the other, and vice versa. If two strands of homopolymers, e.g., poly rA and poly rU are associated, the helix will be designated as poly rA/rU.

In accordance with the present invention, a substantial number (preferably half or more and most preferably all or substantially all) of the phosphate entities

VIIA in the polynucleotide chain are replaced by thio-analogues, thus:

In Formulae VIIB, VIIC and VIID, B represents the base and X represents hydrogen, hydroxyl or substituted hydroxyl.

With reference to Formulae VIIA–VIID, it will be understood that the doubly bonded oxygen (VIIA and VIIC) and the doubly bonded sulfur (VIIB and VIID) are involved in tautomerism as follows:

The polynucleotides of the present invention, in its broad aspect, comprise polynucleotides having the following recurring unit:

VIII wherein B is a purine or pyrimidine base, X is hydrogen or hydroxyl (or a substituted hydroxyl), $n$ is an integer, e.g., 2 to 2000, preferably 10 to 1000 for double strands (see below) or 20 to 1000 for single strands, $Y_1$, $Y_2$, $Y_3$, and $Y_4$ are oxygen or sulfur, at least one of the Y's being sulfur. It will be understood that assignment of a double bond to $Y_2$ and a single bond to $Y_3$ is arbitrary and that a tautomeric equilibrium or a hybrid form exists in which the double bond and the negative charge are shared by $Y_2$ and $Y_3$. The sugar entity, illustrated in VIII by ribose and its 2'-hydroxy derivatives and deoxy ribose, may be replaced by other sugars as explained below.

Such thio-analogues of polynucleotides have enhanced capacity to stimulate cells to produce interferon.

SYNTHESIS OF S-CONTAINING NUCLEOTIDES— TYPE VIIB

EXAMPLE 1

2'-deoxythymidine-5'-triphosphorothioate (XIII) (dTTPS)

The reaction involved are as follows:

In XIII, T signifies the thymine radical. The intermediate XI was not separated. Omitted from Equation 1 is one molecule of imidazole produced in the first stage of reaction. Omitted from Equation 2 is one molecule of imidazole pyrophosphate.

2 grams of 3'-O-acetylthymidine (7 mmole) was dissolved in 20 ml. of absolute pyridine and added to a solution of 3.7 gram triimidazolyl-phosphinsulfide (14 mmole) dissolved in 150 ml. of absolute pyridine. After standing overnight pyridine was evaporated and the resulting residue was shaken in 100 ml. of concentrated ammonia. After 2 hours the solvent was distilled off and the residue was shaken in 100 ml. of water (brought to pH 8.5 by ammonia). After evaporation the residue was taken up in water and chromatographed on a DEAE-cellulose column. The product was eluted with 0.07–0.08 M gradient. Yield: 39,700 $A_{267\ m\mu}$-units (56%). The product was homogeneous by paper chromatography (solvent being 7:1:2 volume proportions of 2-propanol, concentrated ammonia and water) and electrophoresis (pH 7.5) where it was identical to dithymidine (3'→5') phosphate. From this and the reaction described in the next paragraph, we conclude that this substance is the desired monoimidazolidate XII. Thymidine can be used instead of 3'-O-acetylthymidine in reaction (1).

10,000 $A_{267\ m\mu}$-units of XII (1 mmole, triethylammonium salt) dried by evaporation with absolute pyridine 3 X), absolute benzene (I X) and absolute dimethylformamide (I X), were dissolved in 20 ml. of absolute dimethylformamide and 2.5 mmole of pyrophosphoric acid (as tri-n-butylammonium salt) added. After standing overnight the reaction mixture was centrifuged, the precipitate (imidazolium pyrophosphate) washed with dimethylformamide and the dimethylformamide solution chromatographed on a DEAE-cellulose column.

The desired product was eluted with about 0.3 M gradient. Yield: 1700 $A_{267\,m\mu}$-units (17%). The product was transformed into the sodium salt by passing over a Merck I ion-exchange column (Na+form); it was homogeneous by paper chromatography (solvent being 2:5 volumn proportions of 0.5 M ammonium acetate brought to pH=3.8 by formic acid and ethanol) and electrophoresis (pH 7.5 and 3.5), where it was identical to thymidine 5'-triphosphate. The phosphorus determination (see King, Biochem. Jr., 93, 292 (1932) showed thymidine: P=1:2.95. The light absorption maximum in $H_2O$ at 267 m$\mu$ ($\epsilon_M$+9600). Degradation with $E.\ coli$ alkaline phosphatase yielded thymidine 5'-phosphorothioate (about 97%) and thymidine (about 3%).

EXAMPLE 2

Uridine-5'-triphosphorothioate (XVI) (rUTPS)

The reactions (simplified) were as follows:

(3)

(4)

The procedure was as in Example 1 except for the substitution of 2',3'-O-methoxymethylidene uridine (XIV) for acetylthymidine (X).

Treatment with concentrated ammonia was omitted. Yield: 54,000 $A_{259\,m\mu}$-units (77%). The product was homogeneous by paper chromatography (same solvent as in Example 1) and electrophoresis (pH 7.5) where it was identical to diuridine (3'→5') phosphate.

Experiments were essentially carried out as in Example 1. Before ion-exchange chromatography the methoxymethylene group was split off by treatment with 20% aqueous acetic acid for 1.5 hours at room temperature. Yield: 1570 $A_{259\,m\mu}$-units (15%). The product was homogeneous by paper chromatography (solvent as in Example 1) and electrophoresis, where it was identical to uridine 5'-triphosphate. The light absorption maximum in $H_2O$ at 259 m. ($\epsilon_M$=10,000). (Found: C, 15.01; H, 2.90; N, 3.65; P, 12.70; S, 4.02. $C_9H_{12}N_2O_{14}P_3SNa_3 \cdot 8H_2O$ requires C, 15.22; H, 3.97; N, 3.94; P, 13.08; S, 4.51.) It was degraded by $E.\ coli$ alkaline phosphatase to uridine 5'-phosphorothioate (about 97% and uridine (about 3%).

EXAMPLE 3

Adenosine-5'-triphosphorothioate (XIX) (rATPS)

The reactions (simplified) were as follows:

(5)

XVII

XVIII (6)

XIX

The synthesis was carried out as in Example 2, substituting 2',3'-O-ethoxymethylidene adenosine (XVII) for 2',3'-O-methoxymethylidene uridine (XIV). XIX was purified on a DEAE-Sephadex A25 column with 0.3 M triethylammonium bicarbonate.

EXAMPLE 4

Cytidine-5'-triphosphorothioate (XXII) (rCTPS) and inosine-5'-triphosphorothioate (XXIII) (rITPS)

The procedure of Examples 1 and 2 is employed but substituting the respective nucleoside 2',3'-O-methoxymethylidene cytidine,

XX and 2',3'-O-methoxymethylidene inosine,

XXI for the nucleosides of Examples 1 and 2.

The resulting triphosphorothioates have, respectively, the following structural formulae:

XXII and

XXIII

SYNTHESIS OF S-CONTAINING NUCLEOTIDES—TYPE VIIC

EXAMPLE IA

5'-deoxy-5'-mercapto-2'-deoxythymidine-5'-triphosphate (VIIIA)

5'-deoxy-5'-mercapto-3'-O-acetyl thymidine

XA is prepared by the method of Baddiley and Jamison, J. Chem. Soc. (London), 1955, p. 1085 by reacting 5'-deoxy-5'-p-toluene sulfonyl-3'-O-acetyl thymidine with thiol acetate. XA is substituted for 3'-O-acetyl thymidine (X) and triimidazolyl-phosphine oxide (IXA) is substituted for the corresponding phosphine sulfide; otherwise the procedure of Example 1 is carried out as there described. The intermediate XIIA has the structure The end product has the structure XIIIA

XIIIA

EXAMPLE 2A

5'-deoxy-5'-mercapto-uridine-5'-triphosphate (XVIA)

In this instance, 5'-deoxy-5'-mercapto-2',3'-isopropylidine uridine is prepared by the method of Baddiley and Jamison, supra. This thio derivative (XIVA) has the structure

XIVA

XIVA and triimidazolyl-phosphine oxide (IXA) are substituted for XIV and IX, respectively, in the procedure of Example 2, leading to the intermediate XVA

XVA and to the end product XVIA

XVIA

EXAMPLES 3A AND 4A

5'-deoxy-5'-mercapto-adenosine-, cytidine-, and inosine-5-triphosphates

These have the structures

XIXA, XXIIA, XXIIIA where A signifies adenine, C signifies cytosine and I signifies hypoxanthine. Appropriate substitutions are made in Examples 3 and 4, i.e., the phosphine oxide IXA is used in place of the phosphine sulfide IX, and the 2',3'-isopropylidine derivatives of 5'-deoxy-5'-mercapto adenine (XVIIA), 5'-deoxy-5'-mercapto cytidine (XXA) and 5'-deoxy-5'-mercapto inosine (XXIA) are substituted for XVII, XX and XXI respectively. The corresponding intermediates (i.e., compound XVA but with A, C or I replacing U) and the corresponding end products are produced, such end products having the structures shown above, XIXA, XXIIA and XXIIIA.

SYNTHESIS OF S-CONTAINING NUCLEOTIDES—TYPE VIID

EXAMPLES IB THROUGH 4B

In these examples, the procedure of Examples 1, 2, 3 and 4 are repeated but with the following modifications: As in Examples 1A, 2A, 3A and 4A, the 2',3'-isopropylidene derivatives of the 5'-deoxy-5'-mercapto-nucleosides XA, XIVA, XVIIA and XXA are employed, but as in Examples 1, 2, 3 and 4, triimidazolyl phosphine sulfide (IX) is used. Otherwise, the procedures of Examples 1, 2, 3 and 4 are carried out as there described. The monoimidazolidate derivatives corresponding to XII in Example 1 are as follows:

wherein X=H or OH.

The end products are as follows:

(X=H or OH).

XIIIB—5'-deoxy-5'-mercapto-2'-deoxy-thymidine-5'-triphosphorothioate

XVIB—5'-deoxy-5'-mercapto-uridine-5'-triphosphorothioate

XIXB—5'-deoxy-5'-mercapto-adenosine-5'-triphosphorothioate

XXIIB—5'-deoxy-5'-mercapto-cytidine-5'-triphosphorothioate

XXIIIB—5'-deoxy-5'-mercapto-inosine-5'-triphosphorothioate

Polymerization of S-containing neucleotides to produce polynucleotides having in the backbone.

SPECIFIC EXAMPLES

EXAMPLE 5

Poly rASUS (XXIV)

The triphosphoro nucleotides XVI and XIX were co-polymerized thus:

wherein $n$ is an integer, which may be, for example, 2 to 1000. The product synthesized had a molecular weight of about 30,000=approximately 80 nucleotide units and is double-stranded. A single strand has a molecular weight of about 15,000 and about 40 nucleotide units.

The nucleotides XVI and XIX [with the labeled sulfur ($^{35}$S) in XIX] were polymerized by incubating with poly dAT as a template, and DNA-dependent RNA polymerase as the polymerization catalyst.

The polymerization mixture consisted of the following:

|  | μl. |
|---|---|
| XVI (44 μmole/ml.)=3 μmole | 68 |
| XIX (6.5 μmole/ml.)=3 μmole | 460 |
| Poly dAT (10 OD/ml.)=6 OD (optical density units) | 600 |
| DNA-dependent RNA-polymerase (1 mg. protein/ml., specific activity 1400)=420 units | 300 |
| Magnesium acetate (0.1 M) | 240 |
| Standard buffer medium [tris-NH$_4$Cl-solution=1.2 M NH$_4$Cl, 0.3 tris·HCl pH 7.9] | 300 |
| H$_2$O | 1032 |
| Total | 3000 |

This mixture was incubated at 37°. After 11 hours 600 μl. of DNAse-solution [approx. 1 mg. DNase I (Worthington, DPFF-grade) in 1 ml. 0.1 M acetate buffer pH 4.0] was added for 10 minutes. Protein was then removed by extraction with chloroform/iso-amylalcohol. The aqueous layer was concentrated to approximately 0.5 ml. and chromatographed on a Sephadex G25 column.

The material eluted with the void volume was rechromatographed on a Sephadex G100 column. The polymeric product eluted in the void volume was freed of salt by chromatography on a Sephadex G25 column. Yield 6.93 OD poly rAS$^{35}$·US (XXIV).

The resulting poly rAs·US (XXIV) has a $\lambda_{max}$ (H$_2$O, pH 6.5)=259 mμ, $\lambda_{=in}$=242 mμ. The T$_m$ is 49° in 0.01 M sodium citrate pH 7.5, which is identical with T$_m$ for poly rAU (48°) under these conditions. A nearest neighbour analysis by alkaline degradation of this poly rAS$^{35}$·US shows complete transfer of label to 2'(3')-UMPS (XXI) thus:

In addition, 2'-isomers were obtained. In this reaction, the broken line indicates the point of cleavage and the circled sulfur is the labeled sulfur, $^{35}$S, which was derived from adenosine-5'-triphosphorothioate (XIX) and ended up in the uridine (XXV) upon degradation.

Figure 1:
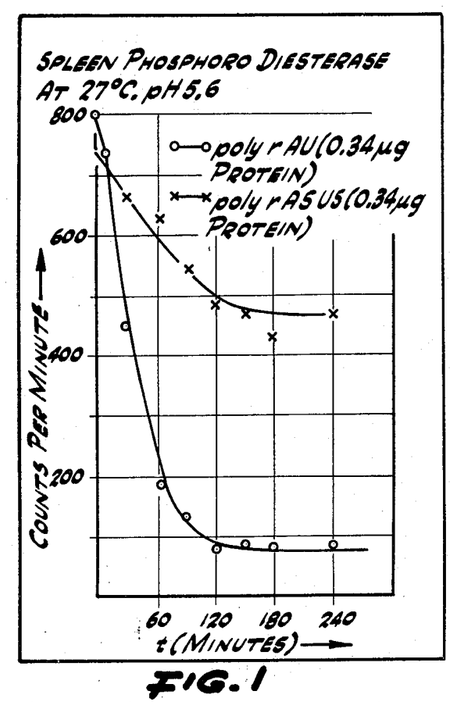
Figure 2:
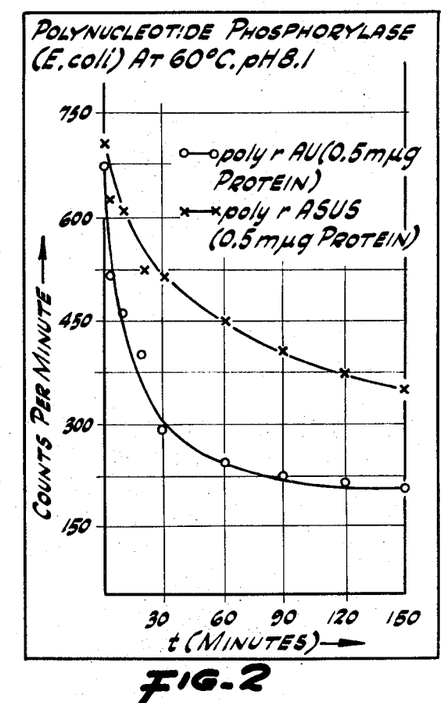
Figure 3:
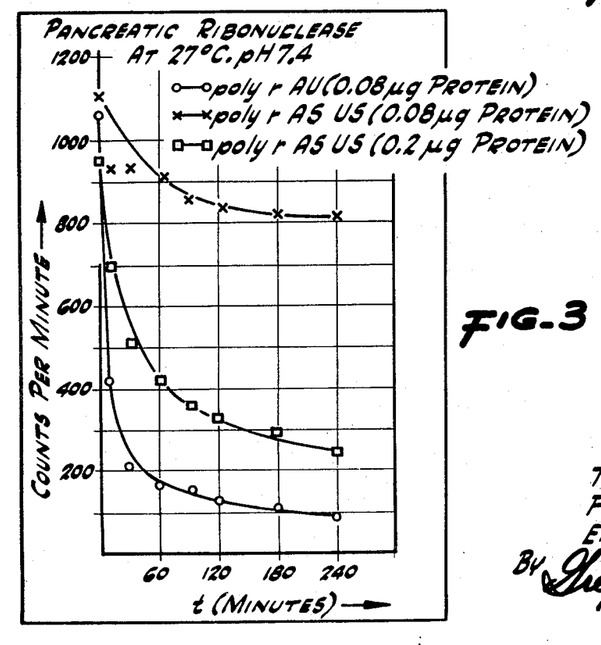
Figure 4:
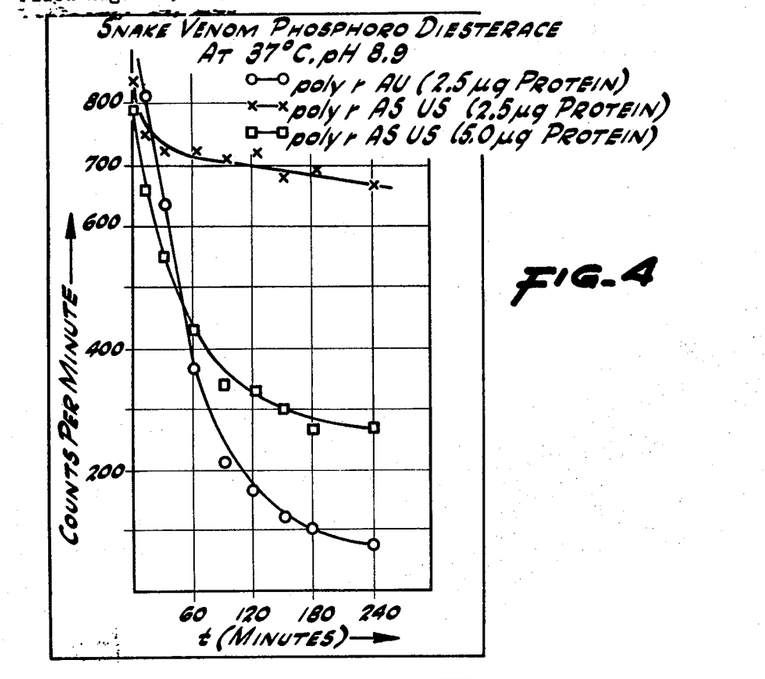
Figure 5:
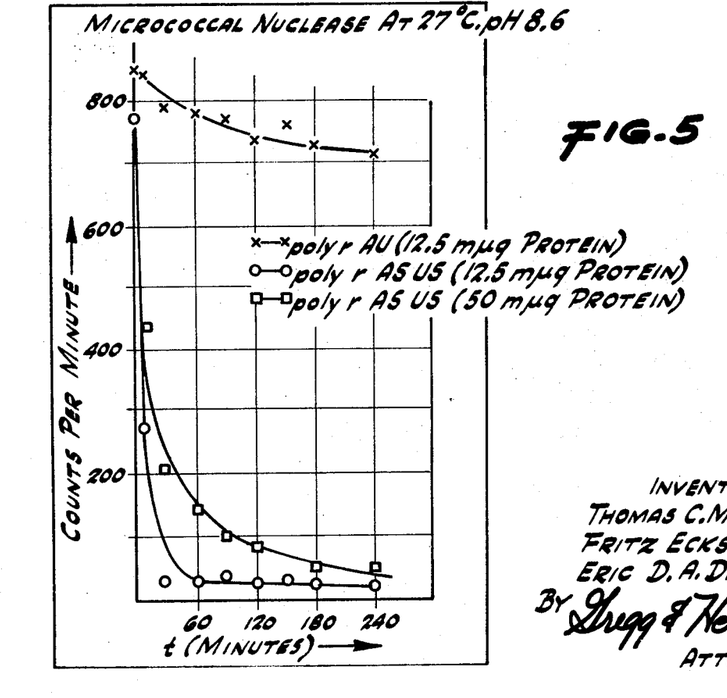

A comparison of the kinetics of degradation of poly rAU and poly rAS·US is shown in FIGS. 1 to 5 of the drawings for 5 different nucleases. Counts per minute (measured by a scintillation counter and produced by the radioactive sulfur) are a measure of the amount of undegraded polymer. See Eckstein and Gindl, FEBS Letters, 2, 262 (1969).

EXAMPLE 6

Poly rCSIS (XXVII)

The incubation mixture consisted of:

|  | μl. |
|---|---|
| Tris-acetate (0.3 M, pH 7.9) | 200 |
| Manganese acetate (0.1 M) | 200 |
| $^{35}$S-rITPS (XXIII) (20μ moles/ml.)=9μ moles | 450 |
| $^{35}$S-rCTPS (XXII), (35μ moles/ml.)=9μ moles | 257 |
| RNA-polymerase (7.5 mg. protein/ml., specific activity 1140) | 200 |
| H$_2$O | 693 |
| Total | 2000 |

The mixture was incubated at 37°. After approximately 66 hours 1 ml. H$_2$O was added, followed by 2 ml. of a 2%-solution of sodium dodecyl sulfate in 0.01 M tris-acetate (pH 7.4). This solution was extracted (3×) with chloroform (isoamylalcohol). The combined aqueous layers were concentrated to approximately 0.5 ml. and chromatographed on a Sephadex G-25 column. The material eluted with the void volume was rechromatographed on a Sephadex G-200 column. This polymeric material was freed of salt by chromatography on a Sephadex G-25 column. Yield approximately 1.5 OD$_{(252)}$ poly rISCS. $\lambda_{max}$ (H$_2$O, pH 6.5) 262 mμ, shoulder at 252 mμ, $\lambda_{min}$ 228 mμ.

The reaction is as follows:

XXII + XXIII ⟶

XXVII

EXAMPLE 6A

Poly rCS/IS

Poly rCS and poly rIS may be prepared by polymerization of rCDPS or rIDPS respectively with basterial polynucleotide phosphorylase without template as described for poly rUS by F. Eckstein and H. Gindl, FEBS-Letters 2 (1969) 262. The single-stranded polynucleotides thus prepared can be annealed to the double-stranded polynucleotide poly rCS/IS

XXVIIA

In the formula of XXVIIA (poly rCS/IS) the broken lines between the strands of poly rIS and poly rCS indicated base pairing.

EXAMPLE 6B

Preparation of poly rISC (XXVIIB)

The incubation mixture consisted of the following:

|  | μl. |
|---|---|
| Tris-acetate (approximately 0.3 M, pH 7.9) | 120 |
| Manganese acetate (approximately 0.15 M) | 120 |
| $^{14}$C-CTP (10μ mol/ml.) approximately 5.4 mol | 540 |
| ITPS (XXIII) (10μ mol/ml.) approximately 5.4μ mol | 540 |
| RNA-polymerase (3.75 mg. protein/ml., specific activity 1140) | 120 |
| Total | 1440 |

This mixture was incubated at 37°. After approximately 43 hours in 1 ml. H$_2$O was added, followed by 2 ml. of a 2%-sol. of sodium dodecylsulfate in 0.01 M tris-acetate (pH 7.4). This solution was extracted (3×) with chloroform/isoamyl alcohol. The combined aqueous layers were concentrated to approximately 0.5 ml. and chromatographed on a Sephadex G 25 column. The material eluted with the void volume was rechromatographed on a Sephadex G 100 column. This polymeric material was freed of salt by chromatography on a Sephadex G 25 column. Yield 6.04 OD$_{(252)}$ poly rISC.

$\lambda_{max.}$ (H$_2$O, pH 6.5) 252 mμ, $\lambda_{min.}$ 228 mμ. The T$_m$ is approximately 57° in 0.1 M sodium citrate pH 7.5. The structure is as follows:

XXVIIB

Examples 5A, 5B, 5C and 5D—In these examples substitutions are made in the procedure of Example 5 as follows:

Example 5A—XVIA and XIXA are substituted for XVI and XIX, respectively, leading to the following:

Example 5B—XVIB and XIXB are substituted for XVI and XIX, respectively, leading to the following:

Example 5C—XVIA and XIXB are used in place of XVI and XIX respectively, leading to the following:

Example 5D—XVIB and XIXA are used in place of XVI and XIX, respectively, leading to the following:

It will be apparent from the above that a range of polymers are available which may be produced by various combinations of the phosphates and phosphorothioates XIII, XIIIA, XIIIB, XVI, XVIA, XVIB, XIX, XIXA, XIXB, XXII, XXIIA, XXIIB, XXIII, XXIIIA and XXIIIB. Such combinations lead to a class of polymers characterized as follows:

$$\left[ \begin{array}{c} \text{structure with } B_1, X_1, B_2, X_2, Y_1=P-Y_2, Y_3=P-Y_4, OH \end{array} \right]_n$$

wherein $B_1$ and $B_2$ are the same or different purine or pyrimidine bases, $X_1$ and $X_2$ are hydrogen, hydroxyl or substituted hydroxyl ($X_1$ and $X_2$ may be the same or different), and $Y_1$, $Y_2$, $Y_3$ and $Y_4$ are oxygen or sulfur at least one of the Y's being sulfur. By analogy with the terminology poly rASUS (Example 5), poly rCSIS (Example 6) and poly rCS/IS (Example 6A) a modified terminology can be used a followss:

poly rAO$\underline{S}$UO$\underline{S}$=polymer of XVIA and XIXA
poly rAS$\underline{S}$US$\underline{S}$=polymer of XVIB and XIXB
poly rCO$\underline{S}$IO$\underline{S}$=polymer of XXIIA and XXIIIA
poly rCS$\underline{S}$IS$\underline{S}$=polymer of XXIIB and XXIIIB
poly rCO$\underline{S}$/IO$\underline{S}$=double strand of polymer of XXIIA and polymer of XXIIIA
poly rCS$\underline{S}$/IS$\underline{S}$=double strand of polymer of XXIIB and polymer of XXIIIB In the foregoing list of polymers, wherever an oxygen or sulfur atom is underscored thus, $\underline{O}$ or $\underline{S}$, it signifies the oxygen atom or the sulfur atoms which forms a part of the polymer backbone (i.e., it enters into ester formation) and connects a phosphorus atom to the 5'-position of the sugar entity. Those oxygen and sulfur atoms that are not underscored are atoms attached to phosphorus but which do not form a part of the polymer backbone (i.e., they do not enter into ester formation). For example, analogues of poly rCI and poly rC/rI in accordance with the present modification and with reference to Examples 6 (poly rCSIS) and 6A (poly rCS/rIS) are prepared and have structures as follows:

poly rCO$\underline{S}$IO$\underline{S}$

In the procedure of Example 6, substitute 5'-deoxy-5'-mercapto-cytidine-5'-triphosphate for rCTPS and substitute 5'-deoxy-5'-mercapto-inosine - 5' - triphosphate for rITPS. The structure of rCO$\underline{S}$IO$\underline{S}$ is as follows:

poly rCS$\underline{S}$IS$\underline{S}$

In the procedure of Example 6, substitute 5'-deoxy-5'-mercapto-cytidine-5'-triphosphorothioate for rCTPS and substitute 5' - deoxy-5'-mercapto-inosine-5'-triphosphoro- thioate for rITPS. The structure of poly rCS$\underline{S}$IS$\underline{S}$ is as follows:

poly rCO$\underline{S}$/IO$\underline{S}$ and poly rCS$\underline{S}$/IS$\underline{S}$ The procedure of Example 6A is followed by substituting (in the case of poly rCO$\underline{S}$/IO$\underline{S}$) 5'-deoxy-5'-mercapto-cytidine-5'-triphosphate for rCTPS to prepare poly rCO$\underline{S}$ and 5'-deoxy-5'-mercapto-inosine - 5' - triphosphate for rITPS. In the case of poly rCS$\underline{S}$/IS$\underline{S}$, the corresponding 5'-mercapto-5'-triphosphorothioates are used. Structures of poly rCO$\underline{S}$, poly rIO$\underline{S}$, poly rCS$\underline{S}$ and poly rIS$\underline{S}$ are as follows:

poly rIO$\underline{S}$—B=hypoxanthine, $Y_1$=oxygen
poly rCO$\underline{S}$—B=cytosine, $Y_1$=oxygen
poly rIS$\underline{S}$—B=hypoxanthine, $Y_1$=sulfur
poly rCS$\underline{S}$—B=cytosine, $Y_1$=sulfur Pairs consisting of (1) poly rIO$\underline{S}$+poly rCO$\underline{S}$, (2) poly rIS$\underline{S}$+poly rCS$\underline{S}$, (3) poly rIO$\underline{S}$+poly rCS$\underline{S}$ and (4) poly rIS$\underline{S}$+poly rCO$\underline{S}$ may be prepared by annealing. These will have the general structure of XXVIIA above but with appropriate substitution of oxygen by sulfur.

IN VITRO TESTS

EXAMPLE 7

Cellular resistance to vesicular stomatitis virus (VSV)

Human skin fibroblasts (HSF) were employed as the host. The polynucleotides were poly rASUS (polymer XXIV of Example 5) and poly rAU, i.e., the oxygen analog of poly rASUS. Poly rAU was prepared exactly as described in Example 5 for poly rASUS but using ATP instead of ATPS and UTP instead of UTPS.

The procedure was as follows: The host cells were cultured identically in MEM (minimal Eagle's medium) and a monolayer of this culture was formed in a Petri dish and held at 37° C. The polymer was dissolved in PDS buffer, 100 micrograms of polymers per ml. of buffer and stored at 4° C. At the time of use this polymer solution was used at dilutions (in MEM) of 40, 4, 0.4, 0.04, 0.004 and 0.0004 micrograms of polymer per millilitre of MEM. The resulting monolayer of cultured cells was covered with four ml. of polymer solution and incubated 24 hours at 37° C. The polymer solution was then removed. Then the challenge virus (VSV) propagated in chick embryo fibroblasts was applied to the monolayer impregnated with the polymer. Controls without the applied polymer were provided. The plates were held at 37° C. for 48 hours and were examined for the number of plaques, each of which was produced by a virus having infected a cell, multiplied within the cell and burst the cell. As is well known, the gel-like medium employed immobilizes the viruses which multiply in and emerge from a cell, and a count of the resulting plaques is a measure of the effectiveness of the virus. Results are set forth in the second column of Table I below wherein the figures represent the concentration of polymer required to reduce VSV plaque formation by 50% as compared to a control. (PDS buffer is a phosphate buffered saline solution described by R. Dulbecco and M. Vogt, J. Exp. Medicine, 99, 1953, p. 167.)

EXAMPLE 8

Interferon production—Monolayers of HSF

Monolayers of cell culture in Petri plates prepared as in Example 7 were each covered with 1 ml. of a solution of 40 or 8 µg. of the polymers of Table 2 (per ml.) of MEM and incubated 3 hours at 37° C. Medium was removed and the monolayer was washed 6 times with MEM. Then 4 ml. MEM were added and the monolayer incubated 21 hours at 37° C. The supernatant fluid was collected and diluted serially with MEM at 1:3, 1:10, 1:30 and 1:100 dilutions. Each dilution was applied to a monolayer of cultured HSF prepared as in Example 7 and incubated 24 hours at 37° C. The medium was removed and VSV was applied as in Example 7. The interferon titre was determined as the reciprocal of the highest dilution of sample which reduced plaque formation by 50% compared to a control. Interferon was characterized by its sensitivity to trypsin and resistance to ribonuclease; also by its lack of activity in heterologous cells.

The results are set forth in the third column of Table I below for two different preparations.

IN VIVO TESTS

EXAMPLE 9

Mouse injections

A standard laboratory strain of Swiss white mice were used as hosts. The mice (male or female) each had a weight of about 25 grams. Each mouse was injected intraperitoneally with 0.5 ml. of PDS solution containing 10 µg. of polymer XXIV. After 6 hours the mice were killed and blood was taken by aspiration from behind the eye. The blood was left at room temperature for two hours and then serum was collected and titrated for interferon vs L929 cells as in Merigan and Finkelstein, Virology, 35, 363–374 (1968). Results were as follows: The serum of mice injected with polymer XXIV had an interferon titre of 25 units/ml. whereas the serum of mice injected with poly rAU had no detectable amount of interferon.

EXAMPLE 10

Rabbit injections

Albino rabbits (male or female), weighing about 1.5 to 2.0 kilograms were injected intravenously with 0.5 ml. of PDS solution containing 20 µg. of poly rAU or polymer XXIV (preparation #2 of Table I). Blood samples were taken by heart puncture, two and four hours after injection. The blood was left at room temperature for one hour, then serum was collected and titrated for interferon in RK 13 cells with vesicular stomatitis virus (plaque reduction technique as described by Merigan and Finkelstein, Virology, 35, 363–374 (1968) for L 929 cells with vesicular stomatitis virus). Interferon was characterized as described in Example 8. Results were as follows: poly rAU stimulated the production of 5 units/ml. (2 hours) and 15 units/ml. (4 hours) of circulating interferon whereas 1000 units/ml. (2 hours) and 600 units/ml. (4 hours) of interferon were found in the serum of rabbits injected with polymer XXIV.

TABLE I

| Polymer | Cellular resistance Minimal inhibitory concentration [1] (µg./ml.) | | Interferon production [2] (units/4 ml.) | | Thermal stability—Tm (° C.) in 0.01 M | | |
|---|---|---|---|---|---|---|---|
| | | | | | In saline | Citrate buffer in saline | |
| | Prep. #1 | Prep. #1 | Prep. #1 | Prep. #2 | (0.15 M Na+) | (0.01 M Na+) | (0.1 M Na+) |
| Poly rASUS (XXIV) | 0.001 | 0.0001 | 62 | 24 | | 48 | |
| Poly rAUS | | 0.01 | | 14 | 69 | | |
| Poly rAU | 0.1 | 1.0 | 26 | <1 | 69.5 | 48 | |
| Poly rA/rU | 0.2 | | <1 | | 57.5 | 38 | |
| Poly rISC (XXVIIB) | | 0.0002 | | 57 | | | 56 |
| Poly rIC | | ≥1.0 | | <1 | | | 47 |
| Poly rI/rC | | 0.01 | | 5–18 | 62 | | |

[1] Concentration of polymer required to reduce VSV plaque formation by 50%.
[2] From 3 to 24 hours after exposure of confluent cell monolayers in 60 mm. Petri dishes to 40 µg. per ml. of the polymer for Prep. #1; 8 µg. per ml. of the polymer for Prep. #2. Cells were freed from polymer after 3 hours, exhaustively washed with MEM (Eagle's minimal essential medium) and further incubated with 4 ml. of MEM per Petri dish.

The last column of Table I sets forth the thermal stability as measured by following ultraviolet absorption of a solution of the respective polymer. The polymer, poly rA/rU, is a multiple strand helix formed from the homopolymers poly rA and poly rU. The hetero polymers, poly rASUS (XXIV) and poly rAU were also in the form of multiple strand helices, and Tm represents the temperature at which the double helical structure begins to dissociate into individual strands of polymers as reflected by increased ultraviolet absorption.

$T_m$ was not measured for poly rASUS (XXIV) in saline solution, which more accurately reproduces the fluid in cells than the citrate buffer. By comparison with the saline and citrate values of poly rAU and poly rA/rU, it is concluded that the $T_m$ of poly rASUS in saline solution is about 69° C.

General description of substrates, templates and biocatalysts of PDS solution containing 20 µg. of poly rAU or polymer of the present invention consist of one or more species of thio-analogues of nucleoside di- or triphosphates in which at least one of the oxygen atoms attached to the phosphorus is substituted by sulfur. Where mixed thio-oxo polymers are to be synthesized, the substrate will contain the normal O-species of nucleoside di- or triphosphate in addition to the S-species. The substrate may be homogeneous (only one species of thio-analogue) or heterogeneous (two or more species of nucleoside di- or triphosphate, at least one of which is the S-species). As will be apparent, the substrate may be homogeneous or heterogeneous with respect to the thio-analogue. Different bases, different sugar entities and/or different placement and numbers of sulfur atoms may be present in the substrate. The sugar unit will ordinarily be a pentose but hexoses may also be used, e.g., d-glucose. Suitable pentoses are ribose, deoxyribose, arabinose, xylose, and such modified pentoses as methylated pentose, e.g., 2'-O-methyl ribose, etc.

The base component of the nucleoside di- or triphosphate may be any of the purine or pyrimidine bases (naturally occurring or synthetic). Following are examples of bases which may be employed:

Adenine
Cytosine
2,6-diamino-4-hydroxy-5-N-methyl-formamidopyrimidine
Dihydrouracil
$N^6,N^6$-dimethyladenine
1-(yy-dimethylallyl)adenine
$N^6$-(yy-dimethylallyl)adenine
2-dimethylamino-6-hydroxypurine, see $N^2,N^2$-dimethylguanine
6-dimethylaminopurine, see $N^6,N^6$-dimethyladenine
$N^2,N^2$-dimethylguanine
Guanine
6-hydroxy-2-methylaminopurine, see $N^2$-methylguanine
$N^6$-(trans-4-hydroxy-3-methylbut-2-enyl)adenine, see Zeatin
6-(trans-4-hydroxy-3-methylbut-2-enylamino)purine, see Zeatin
5-hydroxymethylcytosine
5-hydroxymethyluracil
5-hydroxyuracil
Hypoxanthine
1-($\Delta^2$-isopentenyl)adenine
$N^6$-($\Delta^2$-isopentenyl)adenine
1-methyladenine
2-methyladenine
7-methyladenine
6-methylaminopurine, see $N^6$-methyladenine
4-methylaminopyrimidin-2-one, see $N^4$-methylcytosine
6-(3-methyl-2-butenylamino)purine, see $N^6$-($\Delta^2$-isopentenyl)adenine
3-methylcytosine
$N^4$-methylcytosine
5-methylcytosine
1-methylguanine
$N^2$-methylguanine
7-methylguanine
1-methylhypoxanthine
3-methylhypoxanthine
7-methylhypoxanthine
1-methyl-$N^6$-methyladenine
1-methyl-6-methylaminopurine
1-methyluracil
3-methyluracil
5-methyluracil, see thymine
7-methylxanthine
Orotic acid
4-thiouracil (or 2-thiouracil)
Thymine
Uracil
Xanthine
Zeatin
5-bromouracil
5-iodouracil
8-bromoguanine
8-iodoguanine
4-thiothymine (or 2-thiothymine)
2-amino purine
2-keto purine
7-amino-pyrazolo [4,3-d] pyrimidine
pyrazolo [4,3-d] pyrimidine

The base selection in the substrate may be homogeneous (only a single base) or heterogeneous (two, three, four or more different bases). The resulting polymers may remain as single strands or they may undergo base pairing with strands of the same polymer (where two or more complementary bases are selected) or with strands of a different polymer. Thus a polymer in which only the base adenine is present will form a multiple strand structure with a polymer having only the base thymine. Polymers having hypoxanthine will pair with polymers having cytosine. Base pairing of heteropolymers may be illustrated as follows, it being understood that other bases may be substituted for adenine and uracil and that the sulfur atoms may be variously situated.

A selected substrate may and often will, require a template to orient the nucleotides properly. If a homopolymer (homo in the sense of having a single base) is to be prepared, the template may be a synthetic polynucleotide which is likewise homogeneous with respect to its base but in which the base is capable of pairing with the substrate base. Thus, to produce poly rAS the substrate will be the nucleotide XIX or a low polymer thereof and the template may be poly dT or If poly rCSIS (C=cytidylic acid and I=inosinic acid, S signifying the sulfur analog with sulfur doubly bonded to phosphorus having the formula):

is to be produced, the template may be for example, poly dIC.

The biocatalyst employed to polymerize the nucleotides will depend upon the nature of the substrate. In Table II below are listed, in the first column, suitable nucleotides and nucleotide mixtures; in the second column, suitable biocatalysts; in the third column suitable templates (where needed or preferred); and in the fourth column, the resulting polynucleotides.

TABLE II

| (a) Substrate (nucleotide or nucleotides) | (b) Biocatalyst | (c) Template | (d) Resulting polynucleotide |
|---|---|---|---|
| (1) rATPS | DNA dependent RNA polymerase, e.g., *E. coli* RNA polymerase. | Poly dT | Poly rAS. |
| (2) rATPS + rUTPS | do | Poly dAT | Poly rASUS. |
| (3) rGTPS + rCTPS | do | Poly dGC | Poly rGSCS. |
| (4) rUTPS | do | Poly dA | Poly rUS. |
| (5) rITPS | do | Poly dC | Poly rIS. |
| (6) rCTPS | do | Poly dI | Poly rCS. |
| (7) rCTPS | do | Poly dG | Poly rCS. |
| (8) rITPS + rCTPS | do | Poly dIC | Poly rISCS. |
| (9) rITPS + rCTPS | do | Poly dGC | Poly rISCS. |
| (10) rATPS + rCTPS | do | Poly dIT | Poly rASCS. |
| (11) Mixtures of three or more of the above nucleotides. | do | Polydeoxyribonucleotides with three or more different nucleotides in alternating sequence. | Polyribonucleotides (thio analogues) with three or more nucleotides in alternating sequence. |
| (12) r$\overline{BU}$TPS | do | Poly dA | Poly r$\overline{BU}$S. |
| (13) rUTPS | RNA polymerase, e.g., *Azotobacter vinelandii* RNA polymerase; *Micrococcus lysodeikticus* RNA polymerase; *E. coli* RNA polymerase. | Poly rA | Poly rUS. |
| (14) rATPS | do | Poly rU | Poly rAS. |
| (15) rGTPS | do | Poly rC | Poly rGS. |
| (16) rATPS + rUTPS | do | Poly rAU | Poly rASUS. |
| (17) rGTPS + rATPS | do | Poly rUC | Poly rGSAS. |
| (18) rATPS | do | Poly rT | Poly rAS. |
| (19) rCTPS | do | Poly rG | Poly rCS. |
| (20) rCTPS | do | Poly rI | Poly rCS. |
| (21) rCTPS + rITPS | do | Poly rIC | Poly rISCS. |
| (21a) rCTP + rITPS | do | Poly rIC | Poly rCIS. |
| (21b) rCTPS + rITP | do | Poly rIC | Poly rCSI. |
| (22) Mixtures of three or more of the above nucleotides. | do | Polyribonucleotides with three or more different nucleotides in alternating sequence. | Polyribonucleotide homopolymers. |
| (23) rITPS + rCTPS | RNA polymerase, e.g., *Azotobacter vinelandii* RNA polymerase and *E. coli* RNA polymerase. | None | Poly rISCS. |
| (23a) rITP + rCTPS | do | do | Poly rICS. |
| (23b) rITPS + rCTP | do | do | Poly rISC. |
| (24) rATPS + rUTPS | do | do | Poly rAS/poly rUS. |
| (25) Any of various nucleoside diphosphorothioates, e.g., rUDPS, rADPS, rADPS + rUDPS, rCDPS, rCDPS + rIDPS, rIDPS. | Polynucleotide phosphorylase, e.g., *Azotobacter vinelandii* or *E. coli* polynucleotide phosphorylase or *Micrococcus lysodeicticus* PNPase. | No template but preferably use with a primer such as an oligonucleotide having a free OH in the C3' position. | Corresponding polynucleotides, e.g., poly US, poly AS, poly ASUS, poly CS, poly CSIS, poly IS. |

Referring now to Table II, the following explanations are in order. All of the nucleotides numbered (1) through (24) are the triphosphates (thio analogues) having the general formula wherein r designates the ribose entity and B designates the base entity. Item (25) refers to nucleoside diphosphates having the general formula wherein r and B are as defined above.

In item (12) the nucleotide in column (a) is a ribonucleotide of the base uracil wherein bromine is substituted for hydrogen in the 5-position of the base, thus The base is attached to the ribose entity at the 1-position shown with a dangling valence. The formula r$\overline{BU}$TPS signifies the attachment of bromine (B) to the base (U). Other halo substituted nucleotides may be employed, e.g., r$\overline{IU}$TPS signifying iodine in the 5-position of uracil, r$\overline{ClU}$TPS signifying chlorine in this position, etc. In general, substitution of hydrogen on ring carbons by halogen (Cl, Br, I) has a stabilizing effect.

Those systems such as (23) and (24) which do not require a template are advantageous because the cost of a template is avoided.

In item (25), a template is unnecessary but the system is preferably used with a primer or starter such as an oligonucleotide having a C3' hydroxyl, i.e., a free hydroxyl group in the 3 position of the sugar entity.

In column (c) poly dT signifies polydeoxythymidine, poly dAT signifies a polydeoxynucleotide having alternating adenosine and thymidine units, etc. Where "r" appears it signifies ribose and "d" signifies deoxyribose.

All of the substrate nucleotides [and nucleoside diphosphates, item (25)] of Table II are shown as ribonucleoside triphosphorothioates or ribonucleoside diphosphorothioates. The resulting polyribonucleotides [column (d)] are generally more effective as interferon inducers than the corresponding polydeoxyribonucleotides. Nevertheless, the latter (polydeoxyribonucleotides, in their thioanalogue form) are within the scope of the present invention and they may be prepared by using systems such as those shown in Table IIa.

TABLE IIa

| (a) | (b) | (c) | (d) |
|---|---|---|---|
| dATPS | DNA-dependent DNA-polymerase | Poly dT | Poly dAS/dT. |
| dTTPS | do | Poly dA | Poly dA/dTS. |
| dATPS + dTTPS | do | Poly dAT or none | Poly dASTS. |
| dITPS + dCTPS | do | Poly dIC or none | Poly dISCS. |
| dITPS + dCTP | do | do | Poly dISC. |
| dCTPS + dITP | do | do | Poly dICS. |
| dATPS + dTTP | do | Poly dAT or none | Poly dAST. |
| dTTPS + dATP | do | do | Poly dATS. |
| dITPS + dCTPS | do | dI/dC | dIS/dCS (poly). |
| dITP + dCTPS | do | dI/dC | dI/dCS (poly). |
| dITPS + dCTP | do | dI/dC | dIS/dC (poly). |
| dATPS | Terminal deoxynucleotidyl transferase [using an oligodeoxynucleotide, e.g., d(pTpTpT) as primer]. | No template | Poly dAS. |
| dTTPS | do | do | Poly dTS. |
| dGTPS | do | do | Poly dGS. |
| dCTPS | do | do | Poly dCS. |
| dITPS | do | do | Poly dIS. |
| Or a mixture of any of above nucleotides | do | do | Hetero-polydeoxynucleotide. |
| Or a mixture of any of above nucleotides plus any of the normal triphosphates. | do | do | Mixed polymer with respect to base as well as thiosubstitution. |

Hybrid polynucleotides such as poly rASdAS, poly rASdUS, poly dASrUS, poly dArUS, poly rASdU, etc. may be prepared in which ribonucleotide units alternate with deoxyribonucleotide units in the polymer chain. Such hybrid polynucleotides may be generally designated by the formula poly $rpX_1dpX_2$ wherein r and d represent the ribose and deoxyribose entities, respectively, p represents the phosphate linking entity (at least some of the p's being of the thio species herein described), $X_1$ represents a base and $X_2$ represents the same or a different base. With an appropriate catalyst system, such a hybrid polynucleotide may be made from a substrate consisting of $rX_1TPS$ and $dX_2TPS$, together with a suitable template, by way of example.

Hybrid multiple strands may also be prepared by annealing strands of a polyribonucleotide with strands of polydeoxyribonucleotide, e.g., by preparing an aqueous solution in PDS or 0.15 molar NaCl of poly rAS, preparing a similar equimolar solution of poly dUS, mixing the solutions and holding at room temperature for a period of time, e.g., a few hours, thereby forming poly rAS/dUS. Other such hybrid multiple strand homopolymers will be apparent, e.g., poly rIS/dCS and poly dIS/rCS. (The slash indicates a multiple strand in which one strand consists of one homopolymer and the other consists of a different homopolymer.

In addition to the variants of Table II described above and those set forth in Table IIa, other variants will be apparent with regard to different placement of the sulfur atoms. Thus other tables may be constructed which are identical to Table II but in which, in column (a), each of the nucleotides is replaced by a sulfur analogue in which the sulfur atom is connected at the 5'-position of the ribose entity and the phosphate entity has no sulfur. Likewise a table may be constructed in which sulfur atoms are as indicated in Table II but sulfur atoms are also connected at the 5'-position of the ribose entity. Examples of such reconstructed tables are as follows [with reference to item (1) of Table II]:

TABLE IIb

| (a) | (b) | (c) | (d) |
|---|---|---|---|
| (1'') rATPS | DNA dependent RNA polymerase. | Poly dT | Poly rAS. |

TABLE IIc

| (a) | (b) | (c) | (d) |
|---|---|---|---|
| (1''') rATPSS | DNA dependent RNA polymerase. | Poly dT | Poly rASS. |

In Table IIb, dATPS signifies the nucleotide and in Table IIc, rATPSS signifies the nucleotide The structure of the polynucleotides in column (d) of Tables IIb and IIc will be apparent. The same modifications apply to Table IIa.

It will, therefore, be apparent that new and useful polynucleotides, methods of preparing the same and medical preparations containing the same have been provided.

We claim:

1. Polynucleotides having in their backbone the recurring unit

[I]

$Y_2$, $Y_3$ and $Y_4$ being selected from the group consisting of oxygen and sulfur, at least one of the Y's being sulfur, X being selected from the group consisting of hydrogen, hydroxyl and methoxyl and B being selected from the group consisting of purine and pyrimidine bases.

2. Polynucleotides of claim 1 wherein $Y_2$ is sulfur and the remaining Y's are oxygen.

3. Polynucleotides of claim 1 wherein $Y_1$ or $Y_4$ is sulfur and the remaining Y's are oxygen.

4. Polynucleotides of claim 1 wherein $Y_2$ is sulfur, $Y_1$ or $Y_4$ is sulfur and the remaining Y's are oxygen.

5. Polynucleotides of claim 1 wherein certain of said units have a base $B_1$ and others have a base $B_2$; the bases $B_1$ of one strand of the polymer being capable of base pairing with bases $B_2$ of a second strand of the polymer.

6. Polynucleotides of claim 5 wherein $B_1$ and $B_2$ alternate along the backbone of the polymer.

7. Polynucleotides of claim 6 wherein the pentose is ribose or deoxyribose.

8. Polynucleotides of claim 7 wherein the pentose is ribose.

9. Polynucleotides of claim 8 wherein $B_1$ is adenine and $B_2$ is uracil.

10. Polynucleotides of claim 8 wherein $B_1$ is cytosine and $B_2$ is hypoxanthine.

11. Multiple strand helices of the polynucleotides of claim 11.

12. Multiple strand helices of the polynucleotides of claim 12.

13. Polynucleotides having the structure wherein $n$ is an integer substantially greater than one and $B_1$ and $B_2$ are the same or different purine or pyrimidine bases.

14. Polynucleotides having the structure wherein $n$ is an integer substantially greater than one and $B_1$ and $B_2$ are the same or different purine or pyrimidine bases.

15. Polynucleotides having the structure wherein $n$ is an integer substantially greater than one and $B_1$ and $B_2$ are the same or different purine or pyrimidine bases.

16. A method of synthesizing a polynucleotide having in its backbone the recurring unit

[I]

$Y_2$, $Y_3$ and $Y_4$ being selected from the group consisting of oxygen and sulfur, at least one of the Y's being sulfur, X being selected from the group consisting of hydrogen and hydroxyl and B being a base selected from the group consisting of purine and pyrimidine bases, said method comprising providing a substrate containing at least one phosphorylated nucleoside having the formula wherein $n$ is zero or one, and Z is the pentose entity given above, incorporating in such substrate a biocatalyst which is effective to polymerize said phosphorylated nucleoside and then causing polymerization of the phosphorylated nucleoside to occur.

17. The method of claim 16 wherein the substrate contains at least two such phosphorylated nucleosides one of which has a base $B_1$ and the other a base $B_2$ which are capable of base pairing with one another, whereby a polynucleotide is produced having as the predominant repetitive unit in its backbone the entity and tautomers thereof wherein $s$ is a pentose unit, $Y_1$, $Y_2$, $Y_3$ and $Y_4$ are oxygen or sulfur, at least one of the Y's being sulfur.

18. The method of claim 17 wherein the pentose is ribose or deoxyribose.

19. The method of claim 18 wherein the pentose is ribose.

20. The method of claim 19 wherein $B_1$ and $B_2$ are adenine and uracil, respectively.

21. The method of claim 19 wherein $B_1$ and $B_2$ are cytosine and hypoxanthine, respectively.

22. The method of claim 16 wherein the nucleosidic component of the substrate comprises as a major ingredient at least one nucleotide having the structure 23. The method of claim 16 wherein the nucleosidic component of the substrate comprises as a major ingredient at least one nucleotide having the structure 24. The method of claim 16 wherein the nucleosidic component of the substrate comprises as a major ingredient at least one nucleotide having the structure 25. The method of claim 16 wherein a template is also incorporated in the substrate which is effective to align the nucleosides in desired sequence.

26. The method of claim 16 wherein the biocatalyst is selected to cause alignment of the nucleosides in desired sequence without the need to add a separate template.

References Cited
UNITED STATES PATENTS

| | | | |
|---|---|---|---|
| 3,440,190 | 4/1969 | Melby | 260—211.5 |
| 3,457,253 | 7/1969 | Wechter | 260—211.5 |
| 3,467,648 | 9/1969 | Witzel et al. | 260—211.5 |

LEWIS GOTTS, Primary Examiner

J. R. BROWN, Assistant Examiner

U.S. Cl. X.R.

260—211.5 R; 424—85